United States Patent [19]

Figliuzzi

[11] Patent Number: 4,951,558
[45] Date of Patent: Aug. 28, 1990

[54] BASKET LIFTING MECHANISM FOR COOKING POT

[76] Inventor: Vincent D. Figliuzzi, Rte. 1, Box 169-White Crow Rd., Fort Atkinson, Wis. 53538

[21] Appl. No.: 332,492

[22] Filed: Apr. 3, 1989

[51] Int. Cl.$^5$ .............................................. A47J 37/12
[52] U.S. Cl. ...................................... 99/336; 99/403; 99/410; 99/413
[58] Field of Search ................ 99/327, 330, 331, 332, 99/334, 335, 336, 403, 404, 407, 410, 411, 413, 414

[56] References Cited

U.S. PATENT DOCUMENTS

| 787,837 | 4/1905 | De Vore | 99/336 |
| 2,168,526 | 8/1939 | Ireland | 99/335 |
| 2,215,929 | 9/1940 | Husk | 99/407 |
| 2,766,680 | 10/1956 | Tagliaferri | 99/336 |
| 2,903,958 | 9/1959 | St. Laurent | 99/336 |
| 3,078,786 | 2/1963 | Arvan | 99/336 |
| 3,225,681 | 12/1965 | Wells | 99/410 |
| 3,525,299 | 8/1970 | Gouwens et al. | 99/336 |

FOREIGN PATENT DOCUMENTS

| 3221433 | 12/1983 | Fed. Rep. of Germany | 99/336 |
| 2551645 | 9/1983 | France | 99/403 |

Primary Examiner—Harvey C. Hornsby
Assistant Examiner—M. Spisich
Attorney, Agent, or Firm—The Hill Firm

[57] ABSTRACT

An apparatus for fastening on a cooking pot raises and lowers a basket into the pot under the control of a temperature sensor and timer. The lifting and lowering mechanism includes a hollow outer rod and threaded inner rod, the inner rod being driven by a motor. Various arrangements of controls, housing shapes, and a fastener to the cooking pot are provided, as is a stirring mechanism which plugs in place of the lifting mechanism.

18 Claims, 3 Drawing Sheets

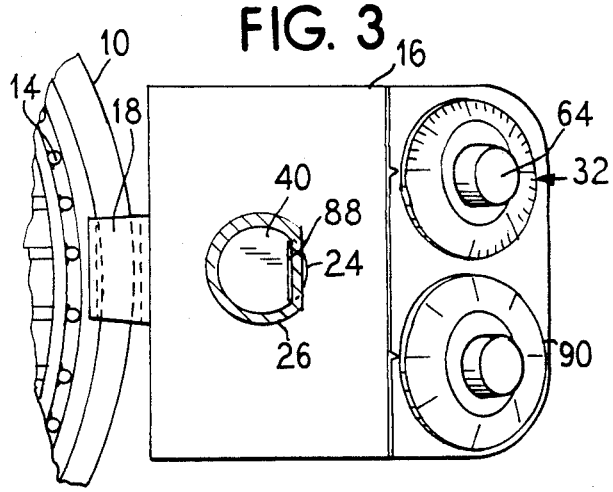
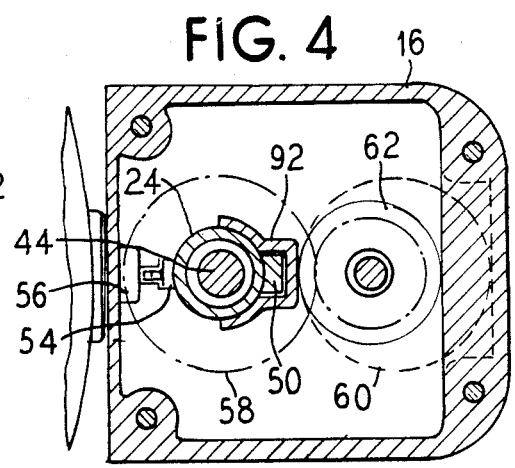
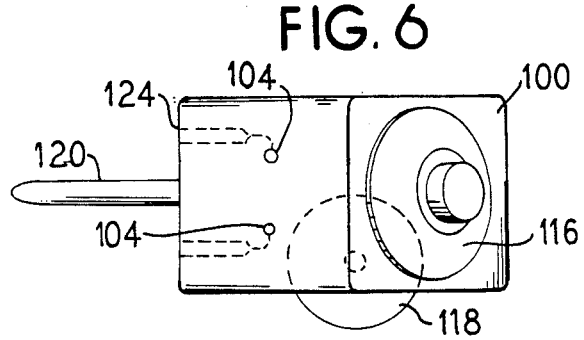
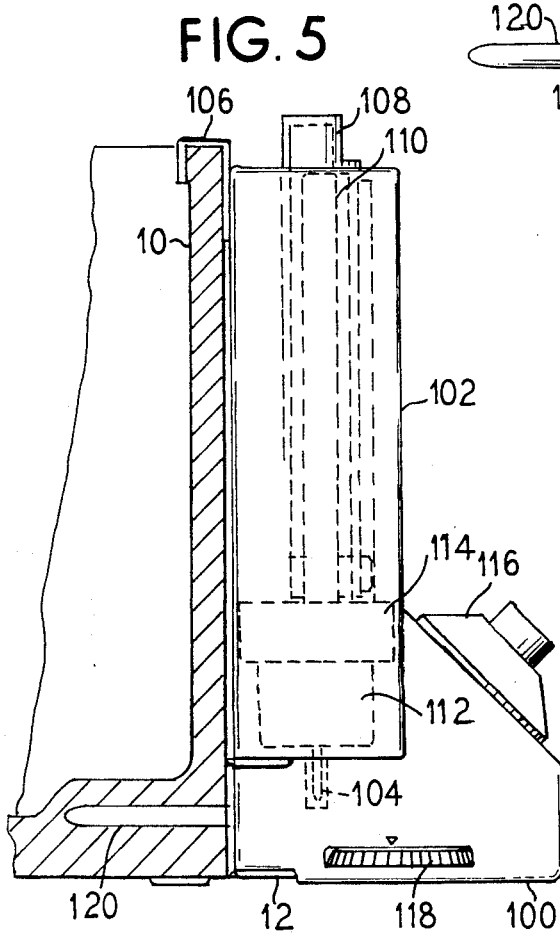
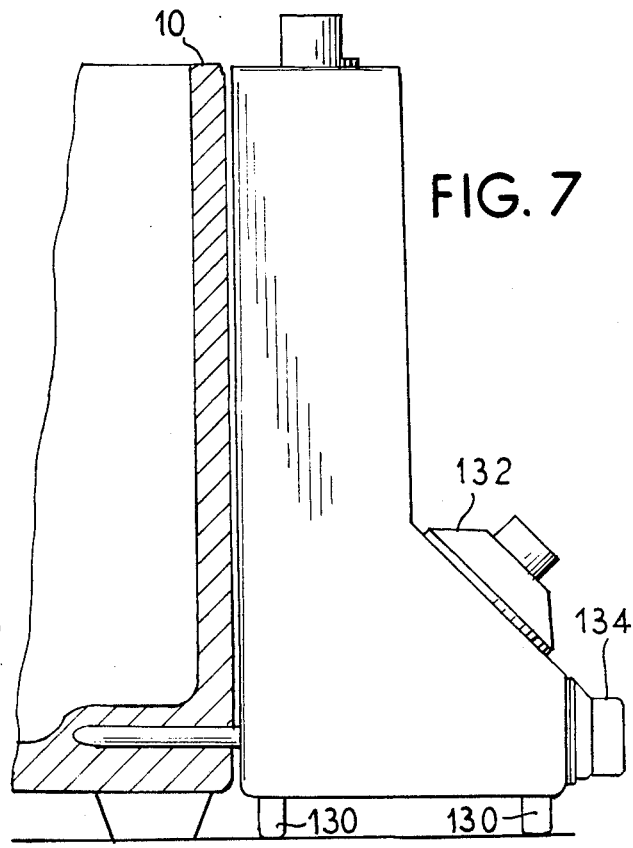

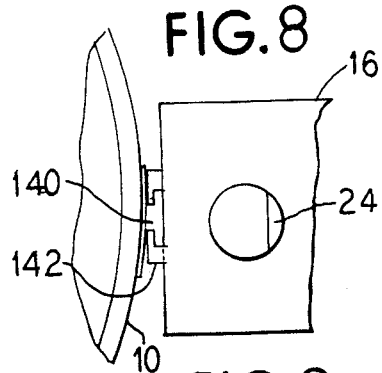
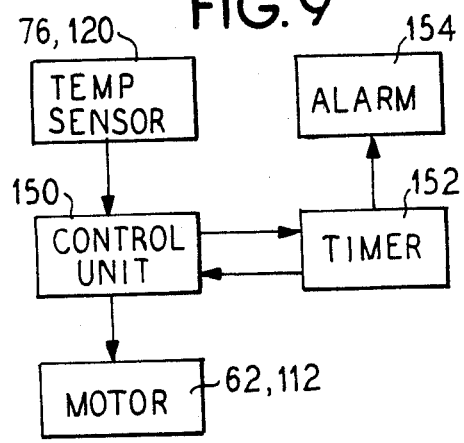
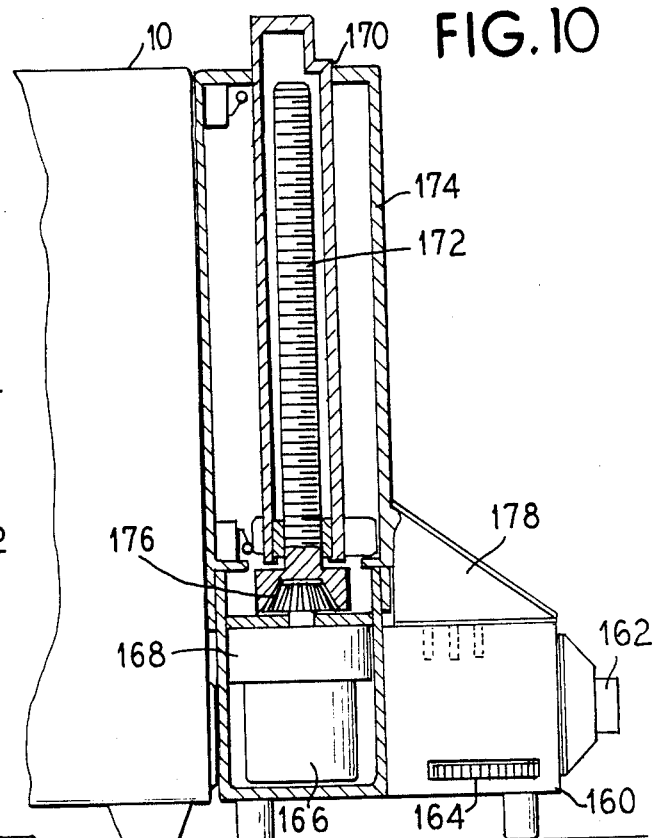
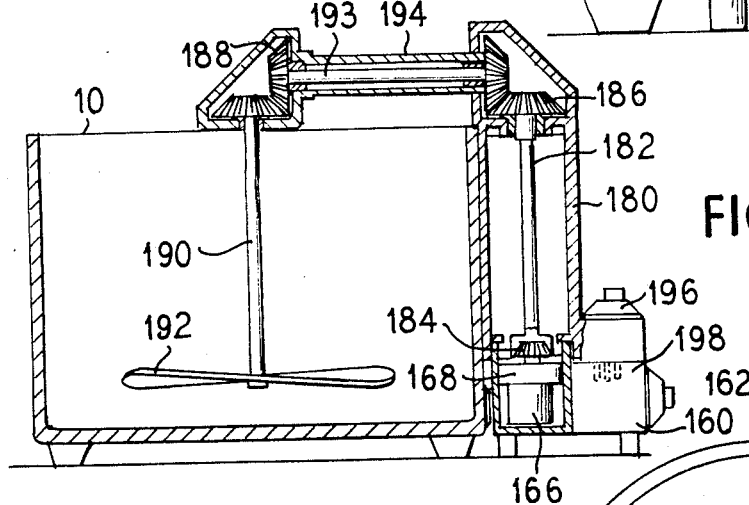
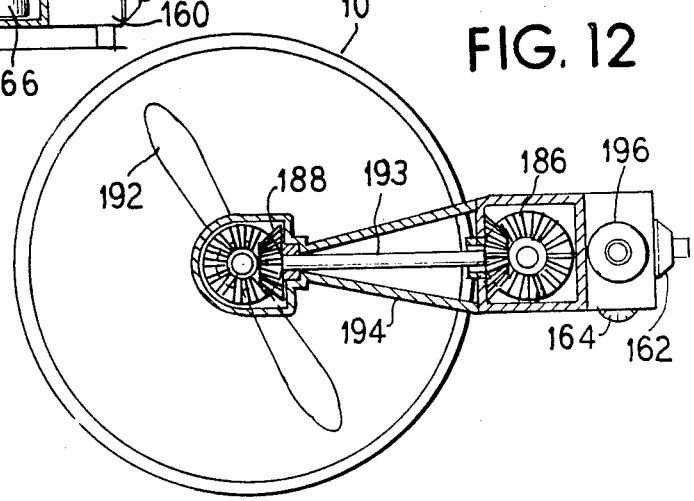

BASKET LIFTING MECHANISM FOR COOKING POT

BACKGROUND OF THE INVENTION

1. Field of the Invention

The present invention relates generally to a mechanism for lowering and raising a basket in a cooking pot and, more particularly, to an apparatus for attachment to an existing cooking pot.

2. Description of the Related Art

A variety of devices are known for raising a cooking basket from a frying pot after the expiration of a predetermined time interval. Generally, these devices are for use in commercial kitchens. An example of a commercial fryer is disclosed in U.S. Pat. No. 3,690,246. Such devices are generally inappropriate for home use, however.

Devices more appropriate for home use are also known including the cooking machine disclosed in U.S. Pat. No. 2,215,929 which automatically raises a basket from a frying pot after a time period has expired.

A further deep fat fryer is disclosed in U.S. Pat. No. 2,915,000 which automatically pops up to remove the food from the cooking medium after a predetermined period of time. The foregoing are integrally formed with the cooking vessel, thereby making clean-up more difficult.

U.S. Pat. No. 3,078,786 discloses a mechanism that is external to the cooking vessel for automatically raising a cooking basket after a predetermined period of time.

A problem occurring in home cooking or boiling is that the cooking medium, such as oil, fat, or water must be heated to the desired temperature before the food product is placed into the cooking medium. The cooking pot must be attended to during heating of the cooking medium to determine when the cooking medium has reached the desired temperature so that the food can be placed therein. Also, many of the known automatic cooking pots have the lift mechanisms formed as an integral part thereof so as to make clean-up difficult.

SUMMARY OF THE INVENTION

It is an object of the present invention to make clean-up of a cooking pot having an automatic lifter considerably easier by providing a basket lifting mechanism which is separable from an immersible cooking pot.

Another object of the invention is to improve the cooking of fried foods by assuring that a correct temperature of the cooking medium has been reached before the food product is placed into the cooking medium.

A further object of the invention is to automatically lower a basket of food product into a cooking pot when a predetermined temperature of the cooking medium has been reached.

Yet another object of the invention is to provide a basket lowering and lifting mechanism for a frying basket which is removably mountable on a frying pot with little or no modification.

A yet further object of the invention is to provide an easily cleaned, easily storable basket lifting and lowering mechanism for a frying pot which does not require an additional power supply.

Another object is to provide an automatic, controllable stirrer for a cooking pot.

These and other objects and advantages of the invention are provided in a basket lifting apparatus for a cooking pot which includes means for fastening the device to the cooking pot, a basket lifting and lowering mechanism in the device, a thermostatic control means for sensing the temperature of a cooking medium in the cooking pot and for causing the lifting and lowering mechanism to lower a basket into the cooking pot upon the cooking medium reaching a predetermined temperature, and a timer means for causing the lifting and lowering mechanism to lift the basket from the cooking pot after a predetermined period of time.

In another embodiment, the apparatus of the invention includes an automatic stirring means for stirring the cooking medium wherein a motor in the basket lifting and lowering mechanism is mechanically coupled to a stirring blade extending into the cooking pot.

The means for fastening the device to a cooking pot includes a coupling for mounting on a fitting of an existing, preferably immersible, cooking pot, such as a commercially available home frying pot. The coupling engages prongs connected to a heating element in the cooking pot which are at the fitting. The thermostatic control means and timer means are thus able to control the application of power to the heating element in the cooking pot. The thermostatic control means includes a temperature sensor element which is placed into thermal contact with the cooking pot, preferably by extending into an opening in the pot, at the fitting so that the thermostatic control means is able to determine the temperature of the cooking medium in the frying pot. The cooking medium can, of course, be a variety of substances, including oil, fat, water, etc. A power cord is also provided extending from the present device for supplying power to the thermostatic control means and timer means as well as to the heating element in the cooking pot via the connections at the fitting.

The lifting and lowering mechanism of a preferred embodiment includes a motor which is controllable by the thermostatic control means and the timer means, the output of the motor being connected to a vertically moveable basket mount for lowering and raising the basket. Generally, a reduction gear assembly is required between the output of the motor and the basket mount. The basket mount of one embodiment includes a threaded track, preferably in the form of a threaded inner rod over which is mounted a hollow outer rod that is threadably engaged to the inner rod. As the inner rod is rotated by the reduction gear assembly, the outer rod, which is restrained from rotating movement, slides vertically to raise or lower the basket.

The basket is mounted on the outer rod by a fitting which mounts over the upper end of the rod. Both the fitting and the upper end of the rod have a non-cylindrical shape, and preferably a D-shape, to prevent rotation of the basket about the rod. This ensures that the basket is lowered into the cooking pot without mishap. A push button or other type switch at a convenient location on the device permits the basket to be raised or lowered at will, such as to interrupt or continue cooking. It is also contemplated to provide for lifting of multiple baskets or basket parts so that one part can be lifted while the other part remains for continued cooking.

Several advantages are provided by forming the various parts of the present device in modular units. For example, the base unit preferably plugs into fittings on currently available cooking pots designed for home use. This enables the present unit to be purchased separately for use on an existing cooking pot, and also facilitates storage by being disassemblable. In one embodiment, the motor and lifting mechanism are separable from the base, also for ease of storage. In a further embodiment, the lifting mechanism unplugs from the base, which contains the motor, and the stirring mechanism is plugged into the base in place of the lifting mechanism, thereby using the same base for both functions. Furthermore, the stirring blade assembly preferably is removable from the stirring mechanism for easy cleaning. Various arrangements of controls, housing shapes and couplings to the cooking pot are possible while remaining within the scope of the present invention.

BRIEF DESCRIPTION OF THE DRAWINGS

FIG. 3 is a cross section along the line III—III of FIG. 2 showing the top of the basket lifting apparatus and the fitting for the basket;

FIG. 4 is cross section along line IV—IV of FIG. 2 showing the inner and outer rods of the lifting and lowering mechanism;

FIG. 5 is a side elevational view of a second embodiment of the basket lifting device;

FIG. 6 is a plan view of the coupling portion of the device of FIG. 5;

FIG. 7 is a side elevational view of yet another embodiment of the basket lifting device;

FIG. 8 is a fragmentary view of a fastening means between the basket lifting device and a frying pot;

FIG. 9 is a functional block diagram of a control circuit for the device of the present invention;

FIG. 10 is a vertical cross section of yet another embodiment of the present device;

FIG. 11 is a vertical cross section of the device of FIG. 10 in which the lifting mechanism has been replaced by a stirring mechanism; and FIG. 12 is a top plan view of the stirring mechanism of FIG. 11.

DESCRIPTION OF THE PREFERRED EMBODIMENTS

Figure 1:
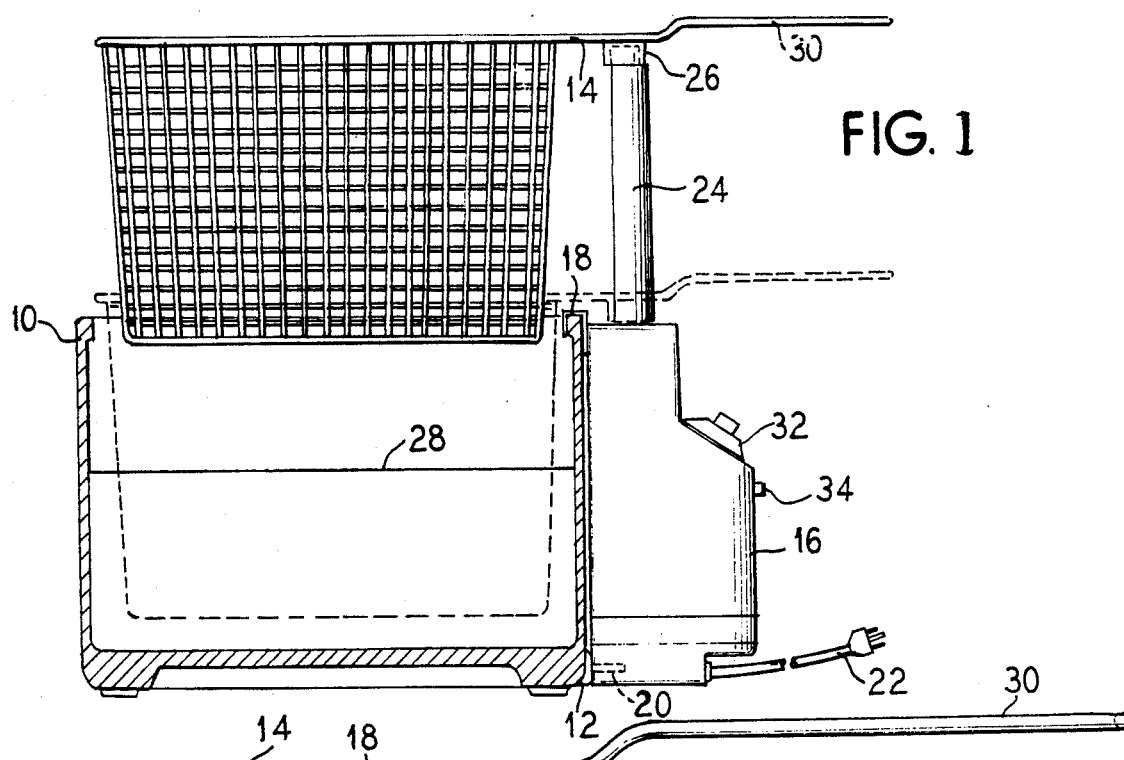
FIG. 1 is a side elevational view, partially in cross section, showing the basket lifting apparatus of the present invention mounted on a cooking pot and holding a basket.

In FIG. 1 is shown a cooking pot 10 of the type which is generally commercially available, having a fitting 12 for accepting a power cord and thermostatic control. The cooking pot 10 is generally intended for deep fat frying, although other types of cooking can, of course, also be performed, such as boiling, etc. Many of the available cooking pots are immersible for easy cleaning, having a heating coil sealed in the base and electrical connections for the coil at the fitting 12. The thermostat and other electrical controls and power supplies are in a removable cord unit. A perforate basket 14 for holding food products to be cooked is provided for lowering into the cooking pot 10 so as to submerge the food products into heated cooking medium 28 therein. The basket 14 is shown in phantom in its lowered position in FIG. 1.

An apparatus according to the present invention is constructed and adapted for connection to the fitting 12 of a known immersible cooking pot, in a preferred embodiment. The apparatus includes an housing 16 which is mounted to the side of the cooking pot 10 by a hook 18 which fastens over a lip of the cooking pot. The housing 16 is preferably sealed to prevent the entry of cooking medium, and the like. The hook 18 supports the weight of the apparatus on the edge of the cooking pot 10. An electrical connection between the apparatus and the cooking pot 10 is provided at the fitting 12 wherein power receiving prongs 20 for the heating element extend into corresponding openings in the apparatus. Power is supplied both to the apparatus as well as to the cooking pot 10 through a power cord 22 extending from the base of the apparatus.

From the top of the housing 16 extends a vertical rod 24 on which the basket 14 is mounted by a fitting 26. The vertical rod 24 moves between a raised position shown in solid outline and a lowered position shown in phantom in FIG. 1. When in the lowered position, the basket 14 is within the cooking pot 10 so that food products held therein are below the level of the cooking medium 28. When in the raised position, the basket 14 and the food therein is above the level of the cooking medium 28. The fitting 26 for mounting to the lifting rod 24 is attached on the basket 14 between the basket portion and a handle 30 by, for example, welding, although other attaching means are also possible. To balance the basket 14, the handle 30 may be weighted. Also visible on the housing 16 is one control 32, of which there are preferably at least two. A manual lift/lower button 34 is also provided on the housing 16 by which the basket lifting mechanism is lifted at will, such as to move the rod 24 from a storage position to a position ready for use. This can also be used to interrupt cooking. The button 34 also lowers the rod 24 for storage of the device at the completion of the cooking cycle and to resume cooking. Any convenient location on the device can be provided for this button, and any type of switch.

Figure 2:
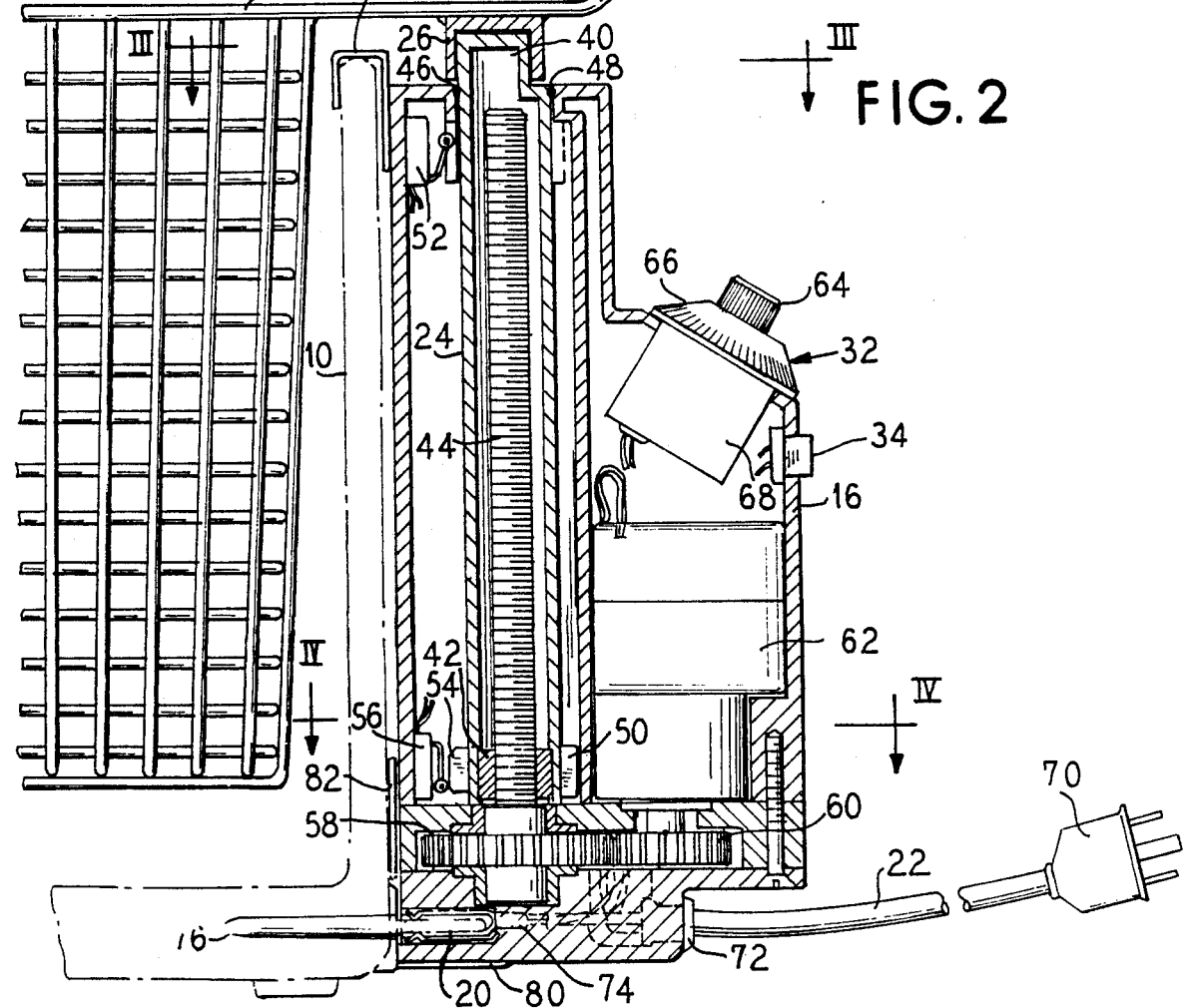
FIG. 2 is an enlarged vertical cross section through the basket lifting apparatus of FIG. 1.

Referring to FIG. 2, the basket 14 is shown in its lowered position with the fitting 26 over an upper end 40 of the rod 24, the remaining portion of the rod 24 being disposed within the housing 16. The rod 24 is hollow and is threadably connected by threaded portions 42 to a threaded rod 44 disposed therewithin. Rotation of the threaded interior rod 44 vertically moves the hollow outer rod 24 in a sliding relationship through an opening 46 in the housing 16. To prevent food and cooking medium from inadvertently coming into the housing 16, an O-ring 48 is provided at the opening 46. Other O-rings and sealing means are also used. Rotation of the outer rod 24 is prevented by a chock 50 mounted thereon which rides in a channel within the housing, as will be described in greater detail in conjunction with FIG. 4. The vertical position of the rod 24 is sensed in its uppermost position by a first microswitch 52 which is activated by a second chock 54 on the side of the rod 24. A second microswitch 56 senses the lowermost position of the vertically slidable rod 24, as is shown.

The threaded rod 44 is rotated by a drive mechanism comprising a reduction gear assembly having a first gear 58 and a second gear 60, the second gear 60 being connected to a drive motor 62. The drive motor 62 may be a stepper motor or the like.

The operation of the motor 62 is controlled by the control 32, which may be arranged at any convenient location on the housing 16. The control 32 includes a knob 64 and a surrounding indicator dial 66 which are connected to a control circuit housing 68.

Power supplied to the apparatus through the power cord 22 which includes preferably a three prong power plug 70. The cord 22 extends through a fitting 72 into a lower portion of the housing 16 to supply power to the control circuit housing 68, the drive motor 62, and the microswitches 52 and 56. Also connected to the power cord 22 are a pair of connectors 74 which engage the prongs 20 extending from the base of the cooking pot 10. As is known, the prongs 20 are connected to a heating element in the base of the cooking pot 10. Extending from the housing 16 into a receptacle opening in the base of the cooking pot 10 is a temperature sensor probe 76. The connector 74 and temperature probe 76 are connected to power through the circuit in the control housing 68.

On many commercially available cooking pots, the prongs 20 are enclosed with an open ended housing to protect them from unintentional contact and from damage. In the illustrated embodiment, a lower wall of the housing 80 extends below the housing 16 of the apparatus while an upper wall 82 thereof has been pivoted vertically and lies against the side of the cooking pot 10. This is the only modification of the known cooking pots required to use this apparatus. Alternately, a slot can be provided in the housing 16 to accept the upper wall 82 of the protective housing, thereby avoiding even this modification.

Referring to FIG. 3, the support hook 18 can be seen extending over the top edge of the cooking pot 10 to support the present apparatus. It is contemplated to provide a notch in the lip of the cooking pot 10 into which the hook 18 engages. The hook 18 is preferably shaped so that the hook 18 can be hooked onto the top lip of the cooking pot and then the apparatus pivoted to bring the temperature probe 76 and the prongs 20 into corresponding engagement. Also in FIG. 3, the outer rod 24 has a circular cross section except for the upper portion 40 thereof which has generally a D-shape with a flattened wall 88. The fitting 26 which is mounted over the upper end 40 of the rod 24 has a similar size and shape opening to prevent turning of the basket 14 when mounted on the outer rod 24.

Two controls are provided on the unit of FIG. 3 wherein a first of the controls is a timer and the second control 90 is a temperature control. As will be explained in greater detail hereinafter, the temperature control is adjusted to determine the temperature at which the basket is lowered into the cooking medium while the timer is set to the period of time during which the basket is to remain submerged in the heated cooking medium before being lifted.

A cross section through the housing 16 is shown in FIG. 4 including the microswitch 56 actuated by the chock 54 on the outer rod 24. On the opposite side of the rod 24 is the second chock 50 which slides along a channel formed by a member 92 to prevent rotation of the rod 24 as the inner threaded rod 44 is rotated by the motor 62 through the gears 58 and 60.

A second embodiment of the apparatus is shown in FIG. 5 including a base unit 100 and a drive unit 102 which are fitted together at a plug connection 104. The drive unit 102 includes a hook 106 extending over the top lip of the cooking pot 10, as before, as well as a vertically slidable outer rod 108 having a inner threaded rod 110. The inner threaded rod 110 is driven by a motor 112 through a reduction gear assembly 114. The reduction gear assembly 114 is preferably a planetary gear assembly, and along with the motor 112, is mounted directly below the rods 108 and 110. Electrical power is supplied to the motor 110 through the plug connection 104, which includes two prongs.

The base portion 100 into which the drive portion 102 is plugged includes a timer knob 116 and a temperature control 118 mounted as shown. The separable portions 102 and 100 provide the advantage that the base unit 100 can be plugged into the base of the cooking pot 10 by inserting the elongated temperature probe 120 into the corresponding receptacle. Thereafter, the drive portion 102 is plugged into the base 100, thereby fastening the hook 106 on the lip of the cooking pot 10. The separate units 100 and 102 also make storage easier and enable additional modular portions to be plugged into the base 100, as will be described later. A further advantage is that the base unit 100 plugs directly into the fitting 12 without modification of the surrounding protective box.

In FIG. 6 is shown the base unit 100 of the second embodiment including the timer 116 and the temperature control 118. The openings for the connectors 104 to the drive unit 102 of FIG. 5 can be seen from the top surface of the base unit 100; and similarly, openings 124 for the heating element prongs at the fitting 12 of the cooking pot are likewise shown.

Since it is not always convenient to fasten the unit to the top lip of the cooking pot, alternate support means for the apparatus may instead be provided. In particular, the embodiment shown in FIG. 7 includes its own support feet 130 mounting on a support surface on which the cooking pot 10 rests. The embodiment shown in FIG. 7 also includes a somewhat different arrangement of control knobs wherein a timer knob 132 is angled upwardly and a temperature control knob 134 is mounted extending from the front the unit. The apparatus of FIG. 7 can either be in one piece, or modular as in FIG. 5.

In FIG. 8 is shown an alternate means for fastening the apparatus to a cooking pot 10. In particular, a T-shaped extension 140 on the side of the cooking pot 10 is engaged in a similarly shaped channel on the apparatus, the channel being formed by opposed prongs 142 in the illustrated embodiment. The extension 140 and the channel into which it mounts have an inverted V configuration when viewed from the side. Various other means for fastening the apparatus to a cooking pot are also contemplated.

In FIG. 9 is shown schematically a control for the present invention. A temperature sensor, such as the temperature sensor 76 or 120 monitors the temperature of the cooking medium 28 in the cooking pot. When a predetermined temperature is reached, a signal is transmitted to control unit 150 which in turn causes the motor 62 or 112 to operate and lower the basket 14 into the cooking pot 10. Simultaneously, the control unit 150 initiates a timing period by a timer 152. At the end of a predetermined time duration, the timer 152 transmits a signal to the control unit 150 to cause the motor 62 or 112 to lift the basket 14 from the cooking pot 10. Simultaneously, the timer 152 activates an alarm 154 to notify the cook that the food product is done.

Another embodiment is shown in FIG. 10 including a base unit 160 having a timer 162 and a temperature control 164 and within which is mounted a motor 166 and reduction gear assembly 168. A lifting rod 170 and threaded rod 172 is provided in a separate modular unit 174 which is mounted as shown in FIG. 10 for lifting and lowering the basket. The threaded rod 172 is rotated through a connector 176 at the output of the reduction gear assembly 168. A cover 178 is provided over a second portion of the base unit 160.

In FIGS. 11 and 12, the modular lifting mechanism 174 has been removed from the base unit 160 and a stirring attachment 180 mounted thereon. The stirring attachment includes a vertical shaft 182 having a connector 184 for connection to the fitting 176 at the output of the reduction gear assembly 168. A first beveled gear pair 186 and a second beveled gear pair 188 transmit rotational energy from the motor 166 to a stirring unit 190 having a stirring blade 192 through a transmission link 193. The blade 192 extends into the cooking pot 10 and stirs the contents thereof. The stirring unit 190 preferably snap fits into the beveled gear pair 188 for easy clean up. A housing 194 is provided around the gear assemblies.

Since it is important that a stirring unit to have a variable speed, a speed control 196 is provided with the modular unit 180. This speed control 196 includes a three prong connector 198 extending into openings covered by the cover portion 178 shown in FIG. 10. The three prongs 198 provide power to the speed control and simultaneously disable the timer mechanism so that constant operation of the stirring mechanism can be achieved.

It is contemplated that more than one basket lifting mechanism may be provided on a single cooking pot, either arranged so that the baskets are side-by-side or so that the baskets are nested. In the latter instance, the lifting mechanism operate in sequence.

Although other modifications and changes may be suggested by those skilled in the art, it is the intention of the inventors to embody within the patent warranted hereon all changes and modifications as reasonably and properly come within the scope of their contribution to the art.

I claim:

1. A device for raising and lowering a basket in a frying pot, comprising:
    a housing adapted for fastening to a frying pot;
    a generally vertically extending rod having an upper end adapted for attachment to a basket, said rod extending from said housing;
    motor means for selectively raising and lowering said rod;
    temperature control means for automatically activating said motor means in response to a predetermined temperature being achieved in the frying pot, said temperature control means causing the basket on said rod to lower into the frying pot;
    timer means for activating said motor means in response to a predetermined interval having elapsed, said timer means causing the basket on said rod to rise out of the frying pot.

2. A device as claimed in claim 1, wherein said temperature control means includes a thermostat probe extending from said housing and adapted to extend into the frying pot for sensing temperature of liquid in the frying pot.

3. A device as claimed in claim 2, wherein said temperature control means includes a manually adjustable control for adjusting said predetermined temperature.

4. A device as claimed in claim 1, wherein said housing is adapted for fastening to a cord plug fitting of a commercially available domestic frying pot.

5. A device as claimed in claim 4, further comprising:
    means for fastening said housing to the frying pot at a location distinct from said cord plug fitting.

6. A device as claimed in claim 1, wherein said rod comprises:
    an outer hollow rod portion mounted in said housing for sliding vertical movement, a first threaded portion in said outer rod portion;
    means for preventing rotation of said outer rod portion;
    an inner rod portion extending into a hollow interior of said outer rod portion, said inner rod portion being connected for rotation by said motor means, a second threaded portion on said inner rod portion in cooperative engagement with said first threaded portion so that said outer rod portion slides vertically as said inner rod portion is rotated.

7. A device as claimed in claim 6, further comprising:
    limit switches mounted for operation by said outer rod portion at predetermined positions, and said limit switches being connected to interrupt operation of said motor means when said limit switches are operated by said outer rod portion.

8. A device as claimed in claim 6, further comprising:
    gears between said motor means and said inner rod portion for transmitting rotational energy from said motor means to rotate said inner rod portion.

9. A device as claimed in claim 1, wherein said housing is in first and second parts, said motor means and said rod being mounted in said first housing part, and said temperature control means and said timer means being in said second housing part.

10. An apparatus for raising and lowering a frying basket in a frying pot, the frying pot having a power cord and thermostat fitting on one side thereof for connecting power to a heating element in the frying pot, the apparatus comprising:
    a coupling adapted for mounting in the fitting on the frying pot, said coupling including connectors for supplying power to the heating element and a temperature sensor element extending into thermal contact with the frying pot;
    an adjustable thermostat control connected to said temperature sensor element and connectable to control application of power to the heating element in the frying pot to generally maintain a predetermined temperature of a cooking medium in the frying pot;
    a basket lifting and lowering mechanism mounted on said coupling and adapted for connection to the basket, said lifting and lowering mechanism being connected to said thermostat control to cause said lifting and lowering mechanism to lower the basket into the frying pot upon the cooking medium reaching approximately the predetermined temperature;
    a timer connected to said lifting and lowering mechanism to cause said lifting and lowering mechanism to lift the basket upon the expiration of a predetermined interval, said timer being adjustable to vary said predetermined interval; and
    an electric cord extending from said coupling through which power is supplied to said thermostat control and said timer and said lifting and lowering mechanism.

11. An apparatus as claimed in claim 10, wherein said lifting and lowering mechanism includes:
    a motor controllable by said thermostat control and said timer;
    a reduction gear assembly connected to an output of said motor, and a vertically movable basket mount adapted for connection to the basket, said basket mount being coupled to an output of said reduction gear assembly and being vertically movable in response to operation of said motor.

12. An apparatus as claimed in claim 11, wherein said vertically movable basket mount includes:

a generally vertically extending rod having a first threaded portion, and threaded track means cooperating with said first threaded portion for vertically moving said rod in response to output from said reduction gear assembly.

13. An apparatus as claimed in claim 12, wherein said vertically extending rod is an outer rod having a hollow interior, said threaded track means is a vertically extending threaded inner rod within said outer rod, said outer rod being threadably connected to said inner rod and being restrained from rotational movement so that said outer rod undergoes sliding vertical movement as said inner rod is rotated via said reduction gear assembly.

14. An apparatus as claimed in claim 13, further comprising:

a housing enclosing at least said basket lifting and lowering mechanism, said outer rod extending through an opening in a top of said housing, and a seal between said housing and said outer rod at said opening.

15. An apparatus as claimed in claim 14, further comprising:

means on said housing for removably fastening said housing to the frying pot.

16. An apparatus as claimed in claim 10, wherein said lifting and lowering mechanism is removably mounted on said couplings.

17. An apparatus as claimed in claim 10, further comprising:

a leg on said coupling adapted for supporting said apparatus on a surface when said coupling is attached to the frying pot which is resting on the surface.

18. An apparatus as claimed in claim 12, wherein said vertically extending rod has an upper end of a non-cylindrical shape, and further comprising:

a fitting mounted on a basket and having a shape corresponding to said non-cylindrical shape, said fitting being cooperatively mountable on said upper end of said rod so that rotation of said basket while mounted on said rod is prevented.

* * * * *